(12) United States Patent
Epworth et al.

(10) Patent No.: US 6,859,586 B2
(45) Date of Patent: Feb. 22, 2005

(54) 3 FIBRE I AND Q COUPLER

(75) Inventors: Richard Epworth, Hertfordshire (GB); James Whiteaway, Hertfordshire (GB); Seb J Savory, Cambridge (GB)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 10/185,136

(22) Filed: Jun. 28, 2002

(65) Prior Publication Data

US 2004/0008941 A1 Jan. 15, 2004

(51) Int. Cl.[7] .............................................. G02B 6/26
(52) U.S. Cl. .......................................... 385/42; 385/46
(58) Field of Search ............................. 385/42, 46, 47, 385/95–97

(56) References Cited

U.S. PATENT DOCUMENTS

| | | | | |
|---|---|---|---|---|
| 4,514,054 A | * | 4/1985 | Stowe | 385/39 |
| 5,170,450 A | * | 12/1992 | Dahlgren | 385/43 |
| 5,459,804 A | * | 10/1995 | Stowe | 385/43 |
| 5,581,641 A | * | 12/1996 | Travis et al. | 385/46 |
| 6,049,645 A | * | 4/2000 | Pan et al. | 385/39 |

OTHER PUBLICATIONS van Deventer, "Phase–Diversity Hybrid Optimization in Case of a Two–Detector Receiver," IEEE Photonics Technology Letters, vol. 4, No. 9, pp. 1060–1062, Sep. 1, 1992.
Davis, "Phase Diversity Techniques for Coherent Optical Receivers," Journal of Lightwave Technology, vol. LT–5, No. 4, 4/87, pp. 561–572.
Kazovsky, "All–fiber 90 Optical Hybrid for Coherent Communications," Applied Optics, vol. 26, No. 3, Feb. 1, 1987, pp. 437–439.

* cited by examiner

Primary Examiner—Edward J. Glick
Assistant Examiner—Thomas Artman
(74) Attorney, Agent, or Firm—Barnes & Thornburg LLP

(57) ABSTRACT

An optical coupler 10 comprising at least three fibres 12, 14 and 16, portions of the fibres being fused to each other to form a coupling region 30 operable to couple light therebetween. At least two of the fibres have inputs 18 and/or 20 and/or 22 and at least two of the fibres have outputs 24 and/or 26 and/or 28. In use, on illumination of at least two of the inputs light intensity is emitted from a plurality of the outputs having a substantially asymmetric phase relationship, such as, for example, a quadrature phase relationship between two of the outputs. The invention also provides for methods of making such a device.

12 Claims, 5 Drawing Sheets

3 FIBRE I AND Q COUPLER

The present invention relates to optical couplers particularly to optical couplers used in coherent optical communication receiver systems.

In optical coherent systems an incoming signal is combined with the optical output of a local oscillator.

If the optical frequencies of the incoming signal and the local oscillator output are identical, then the receiver is operable as a homodyne, recovering the signal directly in the baseband. However, if the local oscillator frequency is offset from the incoming signal frequency the receiver is operable as a heterodyne whereby the electrical spectrum from the output of the detector is centered on an intermediate frequency which is dependent on the offset. In order to track phase fluctuations in the incoming and local oscillator signals the use of phase locking techniques are necessary.

The incoming signal maybe combined with the output of a local oscillator by utilizing a 3 dB optical coupler such as, for example, a 3 dB fibre coupler. When the inputs of a 3 dB fibre coupler are fed with two mutually coherent signals, the coupler emits coherent signals having a phase difference of 180°.

This is undesirable because, in practice, it is difficult to achieve true optical phase locking which results in the signal fluctuating and fading as the relative phase alignment explores all phase possibilities. Furthermore, a modulation format such as Quadrature Phase Shift Keying (QPSK) may be used, in which case, at best only one of the two quadrature can be detected and at worst a single superposition of both quadratures is detected.

The solution to this has been to use a coherent receiver having an optical network which provides optical outputs having quadrature phase relationship such as, for example, a Passive Phase Quadrature Network. The Passive Phase Optical Network provides four output signals, each 90° apart and is typically used as two differential outputs in quadrature.

Passive Phase Optical Networks have been used in coherent system receivers because they provide differential outputs which allow the cancellation of the common mode signal resulting from the local oscillator intensity fluctuations. It is necessary to use local oscillator powers much larger than the signal to achieve maximum receiver sensitivity. Small levels of unwanted amplitude modulation could therefore cause a significant impairment. Passive Phase Optical Networks are intrinsically low loss, and in the absence of an optical amplifier, any loss results in reduced system performance.

However, this network has the disadvantage of requiring four 3 dB couplers. Furthermore, the differential path lengths within the network must be maintained within a fraction of a wavelength if the desired output of quadrature phase relationship is to be achieved. Consequently, it is necessary to ensure that the network is environmentally stable. This is carried out by using, for example, sensors and control electronics at coupling points to monitor and control the differential path lengths, and heat sinks to stabalise the thermal environmental conditions. The need for environmental control electronics to enable this network to produce the desired output is undesirable as it significantly adds to the cost and size of the receiver.

With the introduction of "second generation" coherent optical systems in the form of high gain optical line amplifiers and preamplifiers, coupler loss is a less significant penalty. Excess loss simply requires proportionately higher local oscillator powers. Therefore, there is no longer concern with the loss of photons as the detected signal to noise ratio is dominated by noise within the signal rather than the noise from the detector and subsequent electronic amplifier.

A coupler which is easily manufactured, relatively inexpensive, robust, small, passive and operable to produce output signals having a quadrature phase relationship, is therefore highly desirable.

It is an object of the present invention to provide an optical coupler having the above mentioned advantages. It is also an object of the invention to provide a method of making such an optical coupler.

According to the present invention an optical coupler comprises at least three fibres, at least two of which have an input adapted to receive light and at least two of which have an output adapted to emit light, portions of the fibres being fused to each other to form a coupling region operable to couple light therebetween, characterised in that, on illumination of at least two of the inputs, light is emitted from a plurality of the outputs, their intensities having a substantially asymmetric phase relationship.

The intensities of light emitted from two of the outputs advantageously have a quadrature phase relationship.

The at least two inputs may be adapted to be separately illuminated by mutually coherent signals.

In the coupling region, the fibres are advantageously fused such that they are symmetrically coupled relative to each other.

The optical coupler may comprise a signal fibre operable to receive an optical signal, a passive fibre and a local oscillator fibre adapted for connection to the local oscillator, wherein the quadrature phase relationship exists between the signal fibre and the local oscillator fibre.

The optical coupler may form part of a coherent optical transmission system or a node in an optical network.

The present invention also provides an optical coupler comprising at least three fibres, at least two of which have an input adapted to receive light and at least two of which have an output adapted to emit light, portions of the fibres being fused to each other to form a coupling region operable to couple light therebetween, characterised in that, on illumination of at least two of the inputs, light is emitted from a plurality of the outputs at a predetermined power ratio, which power ratio corresponds to a light intensities having a predetermined phase relationship.

The at least two inputs may be adapted to be separately illuminated by mutually coherent signals.

In the coupling region, the fibres are advantageously fused such that they are symmetrically coupled relative to each other.

Light emitted from two of the outputs may have substantially equal power. The sum of the power from two of the outputs may be substantially 80% of the total power of the light launched into the at least one inputs. The power ratio may be 1:2:2.

The optical coupler may form part of a coherent optical transmission system or a node in an optical network.

The present invention also provides a method of making an optical fibre coupler having first, second and third fibres, at least one of which has an input and at least one of which has an output, comprising the steps of:

positioning the fibres side by side in contact with each other, launching light of a predetermined quantity of power into the input of at least one of the fibres, measuring the power of the light emitted from at least one of the outputs of the three fibres, applying heat to the fibres to cause softening and coupling thereof, applying a substantially equal tensile strain to each fibre, removing the tensile strain on the fibres at a predetermined measured optical coupling characteristic to form an optical coupler, characterised in that the method also comprises the steps of increasing the tensile strain whilst monitoring the power of light emitted from at least one output to define a predetermined asymmetric split ratio of the power of light emitted from each output corresponding to a predetermined desired phase relationship between the light intensities emitted from each output of the coupler in use.

The point at which the predetermined desired phase relationship is reached is cyclic. Therefore, the predetermined desired phase relationship may be obtained again and again by further application of the tensile load and the claims should be construed accordingly.

The predetermined desired phase relationship of the intensities of light emitted from two of the outputs of the coupler in use is 90°.

The fibres are advantageously fused such that they are symmetrically coupled relative to each other.

The fibres maybe twisted around each other to hold them in place during fusing thereof.

The split power ratio is advantageously 1:2:2.

The tensile strain may be increased until the power of light emitted from one of the outputs decreases to substantially 20% of the total power of the light launched into the coupler via the, or each, input.

Alternatively, the tensile strain may be increased until the power of light emitted from one of the outputs increases to substantially 40% of the total power of the light launched into the coupler via the, or each, input.

Alternatively, the tensile load may be increased until the sum of the power of the light emitted from two of the outputs is substantially 80% of the total power of light launched into the coupler via the, or each, coupler.

The present invention also provides a method of making an optical fibre coupler having a first, second and third fibre, at least two of which have an input and at least two of which have an output, comprising the steps of:

positioning the fibres side by side in contact with each other, launching light into the input of at least two of the fibres, measuring the phase relationship of the intensities of light emitted from at least two of the outputs, applying heat to the fibres to cause softening thereof, applying a substantially equal tensile strain to each fibre, removing the tensile strain on the fibres at a predetermined measured optical coupling characteristic to form an optical coupler, characterised in that the light launched into the input of at least two fibres is coherent and that the tensile strain is increased whilst the phase relationship of the intensity of light emitted from at least two outputs is monitored to obtain a predetermined desired phase relationship therebetween.

The point at which the predetermined desired phase relationship is reached is cyclic. Therefore, the predetermined desired phase relationship may be obtained again and again by further application of the tensile load and the claims should be construed accordingly.

The fibres are advantageously fed such that they are symmetrically coupled relative to each other.

The fibres may be twisted around each other to hold them in place during the fusing of the fibres.

The predetermined phase relationship may be quadrature.

An optical coupler made according to the above mentioned method may form part of a coherent optical transmission system or a node in an optical network.

The present invention will be described further, by way of example, with reference to the accompanying drawings, in which.

Figure 1:
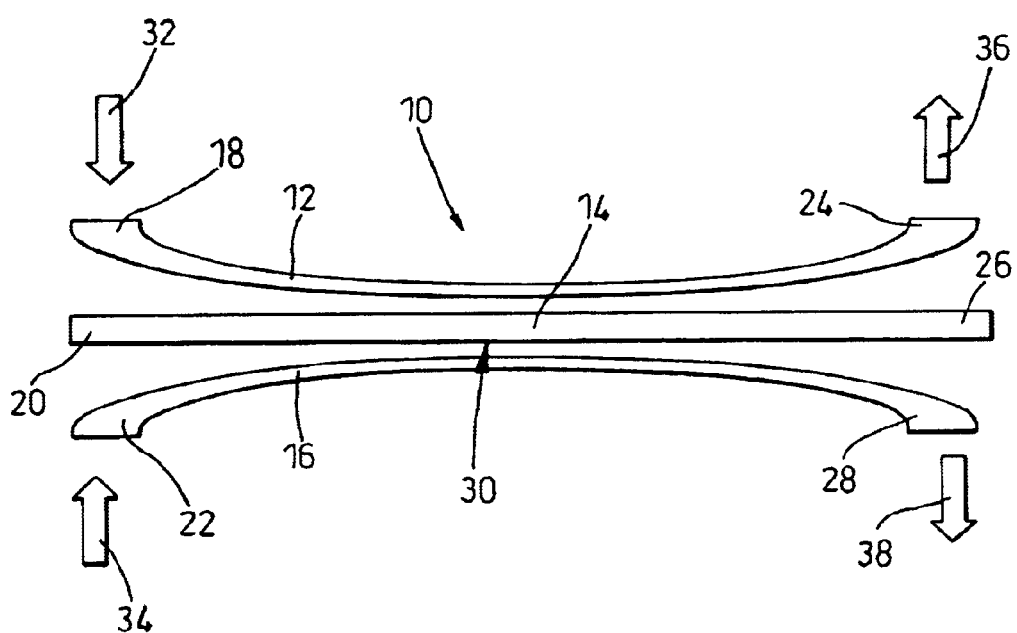
FIG. 1 is a schematic representation of an optical coupler according to the present invention.

Referring to FIG. 1, an optical coupler 10 comprises three fibres which in a coherent system relate to a signal fibre 12, a passive fibre 14 and a local oscillator fibre 16. Each fibre has an input 18, 20 and 22, respectively, and an output 24, 26 and 28, respectively.

A portion of each fibre 12, 14 and 16 is fused to each of the other fibres to form a coupling region 30 intermediate the inputs 18, 20 and 22, and the outputs 24, 26 and 28.

The extent of the coupling of electromagnetic field between fibres within the coupling region 30 is predetermined in the manufacturing process according to the predetermined desired phase relationship between the signal emitted from the signal fibre output 24 and the signal emitted from the local oscillator fibre output 26.

In an optical coherent system it is advantageous to have the incoming signal and local oscillator signal in quadrature to aid the reconstruction of the information carried in the incoming signal. However, it will be appreciated that optical couplers having other phase relationships can be made by altering the coupling of the fibres during manufacturing thereof.

Electromagnetic fields relating to the signals fed into the inputs are coupled in the coupling region 30. The extent of the coupling is established in the manufacturing process and is intrinsic in the manufactured coupler.

The electromagnetic field relating to a signal fed into an input of one fibre is equally coupled, in the coupling region 30, to the other two fibres.

For example, in use, an incoming signal 32 enters the signal fibre 12 though the input 18 thereof. The electromagnetic field relating to the incoming signal 32 is equally coupled to the other two fibres 14 and 16. Similarly, the local oscillator signal 34 enters the local oscillator fibre 16 through the input 22 thereof. The electromagnetic field relating to the oscillator signal 34 is coupled, in the coupling region 30, equally between the other two fibres 12 and 14. Nothing is entered into the passive fibre 20. From the coupling region 30, light is emitted from the outputs, the intensities of which have a predetermined phase relationship relating to the intrinsic coupling established in the manufacturing of the coupler.

The predetermined desired phase relationship is related to the split power ratio of the coupled power at the outputs 24, 26 and 28. In this example the predetermined desired phase relationship between the coupled incoming signal 36 and the coupled local oscillator signal 38 is 90°, which relates to a split power ratio of 1:2:2 measured at the outputs when one input is illuminated. The remainder or the coupled light is emitted from output 26, which may be utilised as a reference, Although the above mentioned embodiment of the present invention relates to a coherent optical receiver system, it will be appreciated that the optical coupler according to the present invention may be utilised in any application whereby two mutually coherent signals are fed into any two of the inputs.

Figure 2:
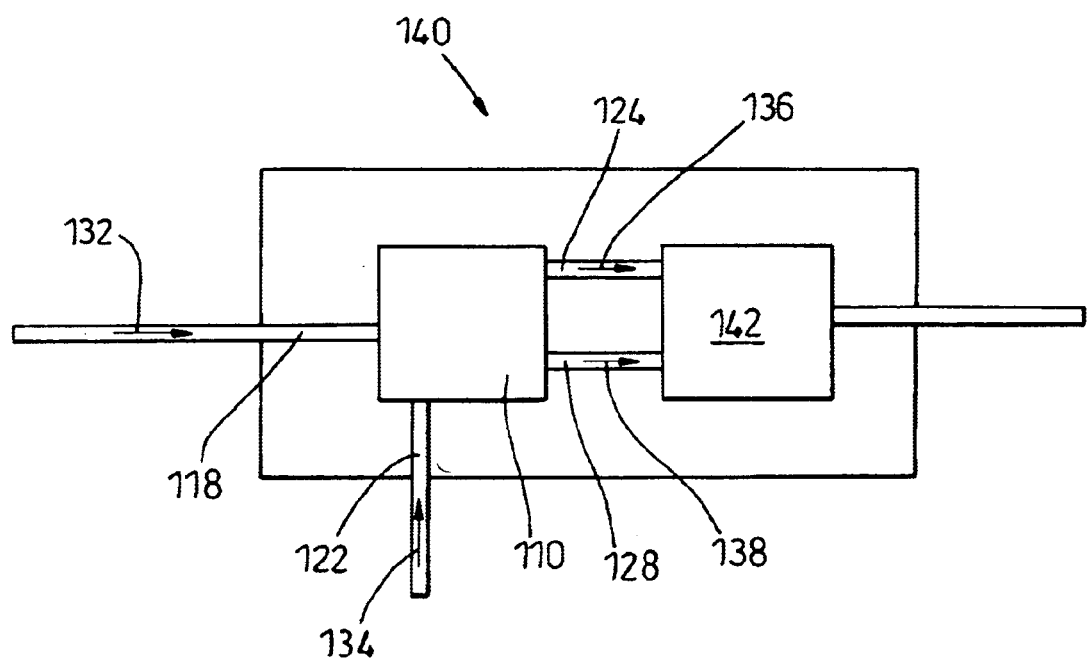
FIG. 2 is a schematic representation of a coherent optical receiver system comprising the optical coupler of FIG. 1.

Referring to FIG. 2, a coherent optical receiver 140, which may be a node in an optical network, comprises an optical coupler 110 having an incoming signal input 118, operable to receive an incoming optical signal 132, and a local oscillator input 122 adapted for connection to a local oscillator and operable to receive a signal 134 therefrom.

The coupler also comprises an incoming signal output 124, operable to emit a coupled incoming signal 136, and a local oscillator output 128, operable to emit a coupled local oscillator signal 138.

The incoming signal output 124 and the local oscillator output 128 are connected to conventional receiver means 142.

In use, the incoming signal 132 enters the coherent optical receiver 140 via the input 118 of the optical coupler 110. The local oscillator signal 134 enters the coherent optical receiver 140 via the input 122 of the optical coupler 110. In the optical coupler 110 the incoming signal 132 and the local oscillator signal 134 are coupled and are emitted via the outputs 124 and 128 as signals 136 and 138 having a quadrature phase relationship. The signals 136 and 138 then enter conventional receiver means 142. The quadrature phase relationship between the signals 136 and 138 aids the reconstruction of the information carried by the incoming signal 136(132).

Figure 3:
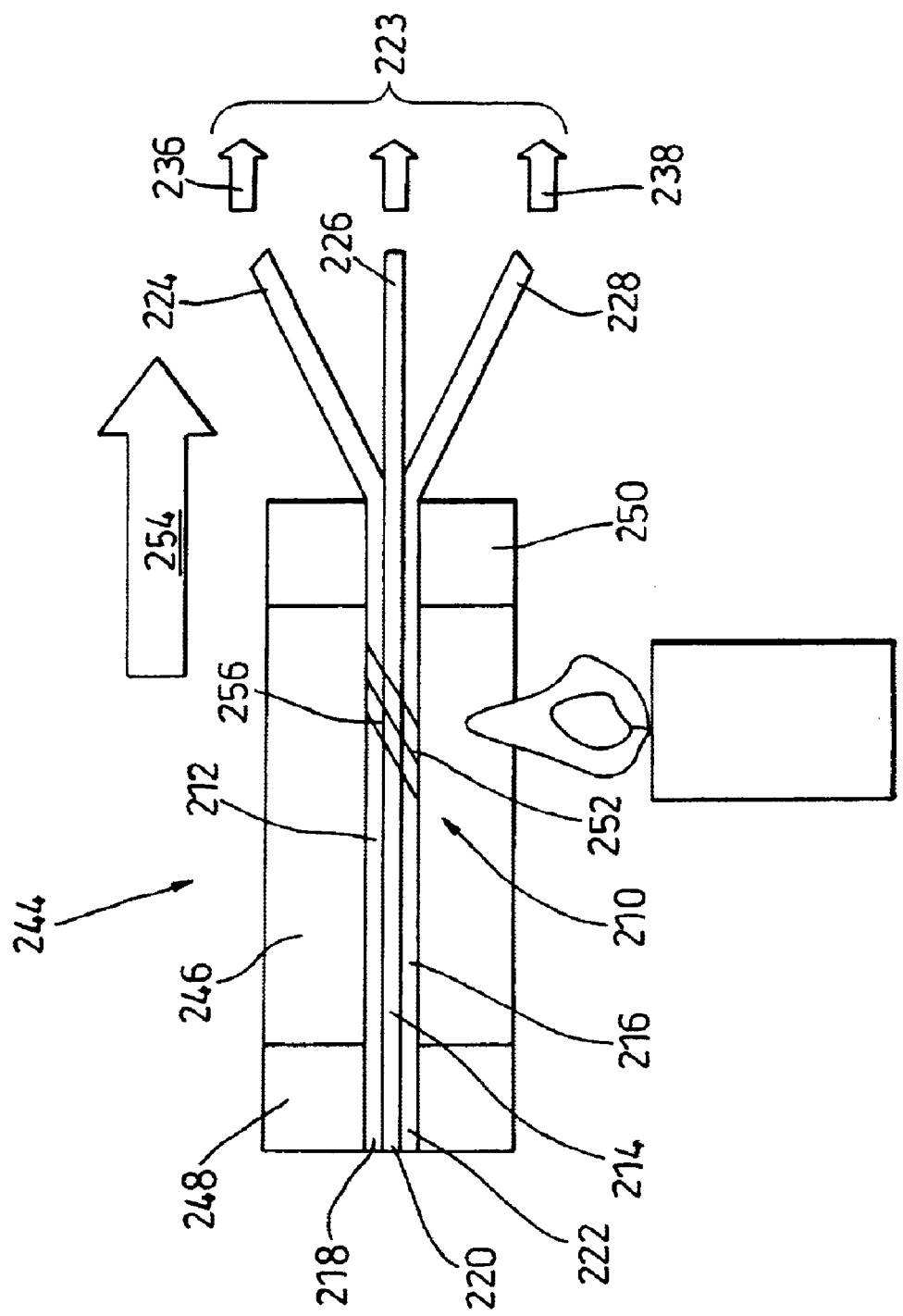
FIG. 3 is a schematic representation of the apparatus for making the optical coupler of FIG. 1.

Referring to FIG. 3, apparatus 244 for making an optical coupler 210 comprises a clamping jig 246 having a first end 248 and a second end 250. In this example, three fibres are utilized to form a three fibre coupler. However it will be appreciated that this method is also applicable to couplers whereby other numbers of fibres are utilised. The three fibres are a first fibre 212, a second fibre 214 and a third fibre 216.

The fibres 212, 214 and 216, are positioned side-by-side. Light of a known quantity of power is launched into the input of one fibre. The power of the light is measured at the output of that fibre as a reference. The fibres may be twisted, or wound around one another to form a twisted connection 252 which holds the fibres relative to each other prior to fusing. However, twisting, or winding, of the fibres is not related to the intrinsic behavior of the coupler.

The fibres 212, 214 and 216 are then clamped in he clamping jig 246 between the first and second ends thereof, 248 and 250 respectively. The fibres may, alternatively, be clamped prior to the twisting or winding procedure.

The fibres are then heated to soften the region of the twisted connection 252 to form a fused coupling connection 256. The clamping jig 246 then applies an equal tensile load, or strain, 254 on the fibres. If the coupler is made sufficiently slowly there is little tension, only elongation of the fibres.

The tensile load, or strain, 254 causes each fibre to be elongated in the softened connection region 252 to form biconal tapers, the fused connection of which, during the pulling process, is aided by the twisted connection 252.

In order to obtain a predetermined desired phase relationship between the coupled incoming signal 236, emitted from the output 224, and the coupled local oscillator signal 238, emitted from the output 228, the tensile force is increased whilst one input, that is either 218, 220 or 222, is fed with optical power of a predetermined quantity. The split ratio 223 of the power of the coupled light emitted from the three outputs, that is, 224, 226 and 228, is monitored until the split power ratio is measured at a predetermined value which corresponds to a desired predetermined phase relationship.

Figure 4:
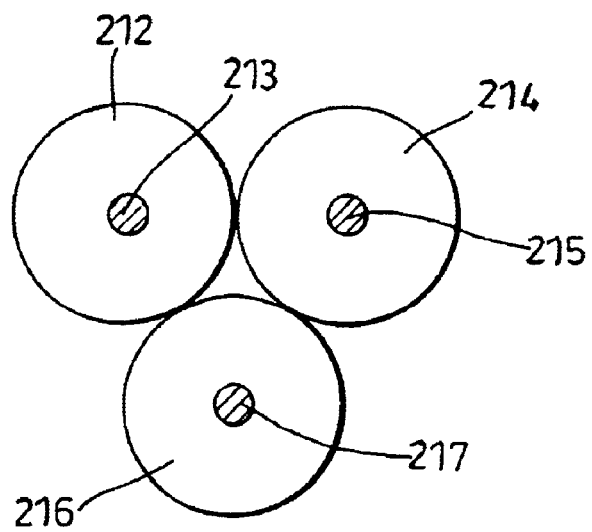
FIG. 4 is a cross sectional schematic representation of tree fibres prior to coupling.
Figure 5:
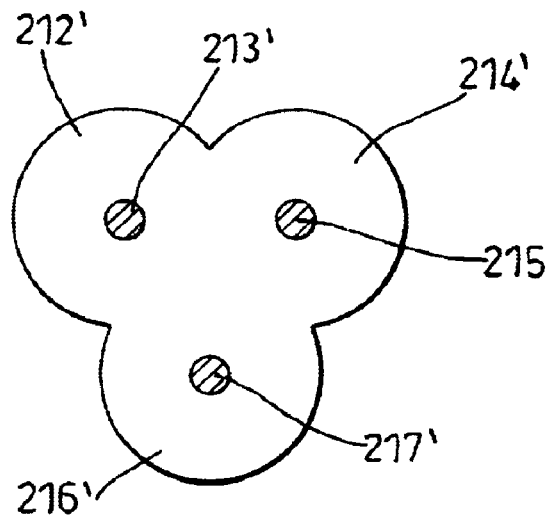
FIG. 5 is a cross sectional schematic representation of the three fibres of FIG. 4 after fusing thereof has taken place to form a coupled connection; and, FIG. 6 is a graph showing the total coupled power (%) relative to the differential phase angle (degrees) for predetermining desired phase relationships during the making of the optical coupler of FIG. 1.

The light which is fed into the input propagates in each fibre in the form of guided core modes. In order that coupling of the light occurs such as to produce the predetermined desired phase relationship, symmetry of the coupling is necesarry. FIG. 4 shows the fibres 212, 214 and 216, disposed prior to fusing and coupling thereof, each having a core 213, 215 and 217, and cladding 219, 221 and 223, respectively. In these uncoupled fibres the respective cladding 219, 221 and 223 is sufficient to maintain the propagating modes within the respective fibres. As the tensile load, or strain, 254 is increased, as the coupling region is softened, the respective cores 213', 215' and 217' and claddings 212', 214' and 216' taper at the connection 252, as shown in FIG. 5, such that the modes are able to couple into the adjacent fibres. However, in order to produce the predetermined desired phase relationship the fibres have to be fused and tapered such that the coupling between each of them is symmetric.

It is known that a symmetric power split ratio of 1:1:1 relates to a phase relationship of 0, +120° and −120°. This is achieved by having each fibre coupled equally relative to the other two fibres. However, this phase relationship has been a consequence of the predetermined desired symmetry of the power of the output signals, not the phase relationship. Alternatively, if the tensile load 254 is increased until the power split ratio of 1:2:2 is detected, the phase relationship is 0, +135° and −135°, relating to a quadrature phase relationship between the coupled incoming signal 236 and the coupled local oscillator signal 238. In this case, 20% of the power remains in the fibre which is illuminated with the remaining 80% of the power split equally between the other two fibres.

The predetermined desired phase relationship at the outputs can be achieved by, whilst increasing the tensile load, or strain 254, measuring the optical power emitted at one or more of the outputs 224, 226, 228 relative to the total optical power fed into one of the inputs 218, 220 or 222. For example, a desired quadrature phase relationship can be achieved by, whilst increasing the tensile force: measuring one output until the through power drops to 20%; measuring one output until the coupled power increases to 40%; measuring two of the outputs until the sum of the powers thereof increases to 80%; or, measuring all the outputs to close to the aforementioned percentages.

Also referring to FIG. 3, in an alternative method, the fibres 212, 214 and 216 are positioned side-by-side in contact with each other. The inputs of two of the fibres are fed separately with two mutually coherent signals and the phase relationship of the intensities of light emitted from two of the outputs is measured Heat is applied to the connection region 252 of the fibres, which can be twisted around each other to hold them in place. However, this twisting step has no relation to the inherent behavior of the manufactured coupler. The applied heat softens the fibres in the connection region 252. A tensile strain 254 is then applied equally to the fibres to form a coupling connection 256. As for the abovementioned method, it is necessary for the coupling between the fibres to be symmetric. The coupling of the electromagnetic fields related to the coherent signals fed into the inputs of the two fibres is carried out in the coupling region 256, as described above for the other method. However, the phase relationship of the intensities of light 236 and 238 emitted from two of the outputs 224 and 228 is measured whilst the tensile strain 254 is increased until a predetermined desired phase relationship of the light intensities is measured. At which point the tensile strain 254 and beat is removed from the fibres forming an optical coupler that, when fed with two mutually coherent signals into the inputs of two of the fibres, will emit light intensities from two of the outputs having a predetermined desired phase relationship between outputs of two of the fibres.

For both methods, the point at which the predetermined desired phase relationship is reached is cyclic. Therefore, the predetermined desired phase relationship may be obtained again and again by further application of, or increasing, the tensile load and the claims should be construed accordingly.

This quadrature phase relationship enables this three fibre coupler to be utilized in similar applications to the Passive Phase Quadrature Network whilst having the advantages of being easy to manufacture, relatively inexpensive, passive, robust, and relatively small in size. An optical coupler made according to this method may be utilized in a coherent optical receiver or a node in an optical network.

This method is particularly advantageous as it provides for an engineer to request an optical coupler having a desired phase relationship at the outputs by specifying to a manufacturer the split power ratio of the outputs. A measurement which is significantly easier to detect than coherent measurement of relative phase and which is detectable using less sophisticated equipment.

It will be appreciated that increasing the tensile load to other predetermined split power ratios would relate to other predetermined desired phase relationships between the outputs, having other advantageous applications.

Figure 6:
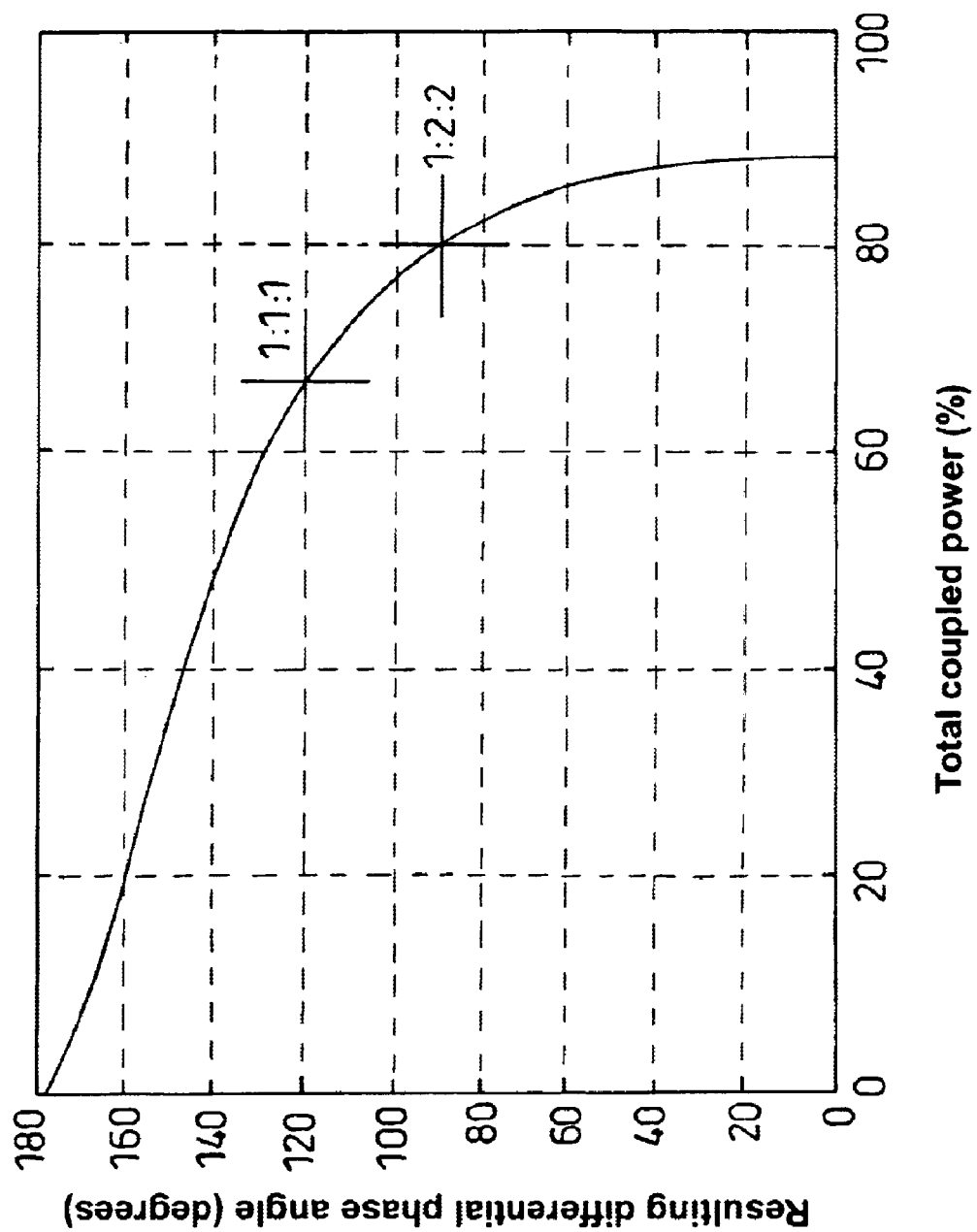

FIG. 6 is a graph showing the relationship between Total Coupled Power (%) and Resulting Differential Phase Angle (degrees). The points marked on the curve relate to the known symmetric 1:1:1 power split ratio and the 1:2:2 power split ratio.

In mathematical terms the scattering matrix is $$S_{I/Q} = \begin{pmatrix} \sqrt{0.2} & \sqrt{0.4}\exp\left(j\frac{3\pi}{4}\right) & \sqrt{0.4}\exp\left(j\frac{3\pi}{4}\right) \\ \sqrt{0.4}\exp\left(j\frac{3\pi}{4}\right) & \sqrt{0.2} & \sqrt{0.4}\exp\left(j\frac{3\pi}{4}\right) \\ \sqrt{0.4}\exp\left(j\frac{3\pi}{4}\right) & \sqrt{0.4}\exp\left(j\frac{3\pi}{4}\right) & \sqrt{0.2} \end{pmatrix}$$

To derive this I begin with the scattering matrix for a 3×3 coupler with coupling coefficient k and interaction length l which is given by[1]

[1] Ja Y.H., IEEE Jnl Quantum Elect, equation (1), pp 2749–2757 Vol. 28, No. 12, 1992

$$S = \begin{pmatrix} a & b & b \\ b & a & b \\ b & b & a \end{pmatrix}$$

$$a = \frac{2}{3}\exp(jkl) + \frac{1}{3}\exp(-2jkl)$$

$$b = \frac{1}{3}(\exp(-2jkl) - \exp(jkl))$$

when the 3×3 coupler is used in a coherent detector only two ports are illuminated (signal and local oscillator), such that the outputs are given by $$E_{out} = \begin{pmatrix} a & b & b \\ b & a & b \\ b & b & a \end{pmatrix}\begin{pmatrix} E_{sig} \\ 0 \\ E_{lo} \end{pmatrix} = E_{sig} + E_{lo}$$

where $$E_{sig} = \begin{pmatrix} a \\ b \\ b \end{pmatrix}E_{sig} \qquad E_{lo} = \begin{pmatrix} b \\ b \\ a \end{pmatrix}E_{lo}$$

from which it follows that the coherent products will be given by $$E_{sig} \cdot E_{lo}^* = \begin{pmatrix} a \cdot b^* \\ b \cdot b^* \\ b \cdot a^* \end{pmatrix} E_{sig}E_{lo}^*$$

therefore $$E_{sig} \cdot E_{lo}^* = \frac{1}{9}\begin{pmatrix} \cos(3kl) - 1 + 3j\sin(3kl) \\ 2 - 2\cos(3kl) \\ \cos(3kl) - 1 - 3j\sin(3kl) \end{pmatrix} E_{sig}E_{lo}^*$$

for 90 degrees between port 1 and port 3 requires $$\cos(3kl) - 1 = \pm 3\sin(3kl)$$

therefore $$-2\sin^2\left(\frac{3kl}{2}\right) = \pm 6\sin\left(\frac{3kl}{2}\right)\cos\left(\frac{3kl}{2}\right)$$

i.e.

$$kl = \frac{2}{3}(m\pi \pm \arctan 3)$$

where m is an integer. Noting that $\arctan(3) < \pi/2$ it follows that the minimum coupling length is $$kl = \frac{2}{3}\arctan 3$$

the scattering matrix may be normalised such that the leading diagonal terms are real such that $$S = \begin{pmatrix} c & d & d \\ d & c & d \\ d & d & c \end{pmatrix}$$

$$c = a\frac{a^*}{|a|} = \frac{1}{3}\sqrt{4\cos(3kl) + 5}$$

$$d = b\frac{a^*}{|a|} = \frac{1}{3}\frac{\cos(3kl) - 1 - 3j\sin(3kl)}{\sqrt{4\cos(3kl) + 5}}$$

for $$kl = \frac{2}{3}\arctan 3$$

it follows that $\cos(3kl) = -\frac{4}{5}$ and $\sin(3kl) = \frac{3}{5}$ therefore $c=\sqrt{0.2}$ $$d = -\sqrt{0.2} - j\sqrt{0.2} = \sqrt{0.4}\exp\left(\frac{3\pi}{4}\right)$$

which gives the scattering matrix as:

$$S_{I/Q} = \begin{pmatrix} \sqrt{0.2} & \sqrt{0.4}\exp\left(j\frac{3\pi}{4}\right) & \sqrt{0.4}\exp\left(j\frac{3\pi}{4}\right) \\ \sqrt{0.4}\exp\left(j\frac{3\pi}{4}\right) & \sqrt{0.2} & \sqrt{0.4}\exp\left(j\frac{3\pi}{4}\right) \\ \sqrt{0.4}\exp\left(j\frac{3\pi}{4}\right) & \sqrt{0.4}\exp\left(j\frac{3\pi}{4}\right) & \sqrt{0.2} \end{pmatrix}$$

What is claimed is:

1. An optical coupler comprising exactly three fibres, at least two of which have an input adapted to receive light and said at least two of which have an output adapted to emit light, portions of the fibres being fused to each other to form a coupling region operable to couple light therebetween, wherein, in the coupling region, all the fibers are symmetrically coupled relative to each other so that the electromagnetic field introduced into any one of said at least two inputs is equally coupled in the coupling region to said at least two outputs and wherein, on illumination of any one of the inputs the split power ratio is 1:2:2, and light emitted from the two outputs have intensities having a substantially asymmetric phase relationship.

2. An optical coupler as claimed in claim 1, wherein the intensities of light emitted from the at least two outputs have a substantially quadrature phase relationship.

3. An optical coupler as claimed in claim 1, wherein the at least two inputs are adapted to be separately illuminated by mutually coherent signals.

4. An optical coupler as claimed in claim 1, comprising a signal fibre operable to receive an optical signal, a passive fibre and a local oscillator fibre adapted for connection to a local oscillator, wherein the quadrature phase relationship exists between the outputs of the signal fibre and the local oscillator fibre.

5. A coherent optical transmission system comprising an optical coupler as claimed in claim 1.

6. A node in an optical network comprising an optical coupler as claimed in claim 1.

7. An optical coupler comprising exactly three fibres, at least two of which have an input adapted to receive light and said at least two of which have an output adapted to emit light, portions of the fibres being fused to each other to form a coupling region operable to couple light therebetween, wherein, in the coupling region, all the fibers are symmetrically coupled relative to each other so that the electromagnetic field introduced into any one of said at least two inputs is equally coupled in the coupling region to said at least two outputs and wherein, on illumination of any one of the inputs, light is emitted from the outputs at a power ratio of 1:2:2, which power ratio corresponds to light intensities having a predetermined phase relationship.

8. An optical coupler as claimed in claim 7, wherein light emitted from two of the outputs have substantially equal power.

9. An optical coupler as claimed in claim 7, wherein the at least two inputs are adapted to be separately illuminated by mutually coherent signals.

10. An optical coupler as claimed in claim 7, wherein the sum of the power emitted from two of the outputs is substantially 80% of the total power of light launched into the at least one inputs.

11. A coherent optical transmission system comprising an optical coupler as claimed in claim 7.

12. A node in an optical network comprising an optical coupler as claimed in claim 7.

* * * * *